F. N. RUSSELL.
TROLLEY WHEEL.
APPLICATION FILED NOV. 2, 1921.
1,418,833.
Patented June 6, 1922.
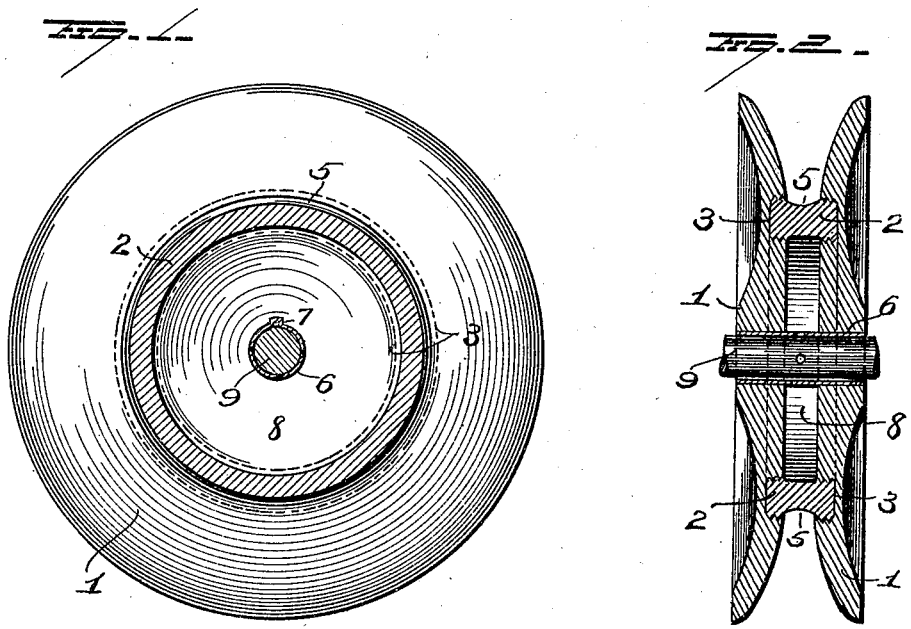

UNITED STATES PATENT OFFICE.

FRANK N. RUSSELL, OF ELMIRA, NEW YORK.

TROLLEY WHEEL.

1,418,833.  Specification of Letters Patent. Patented June 6, 1922.

Application filed November 2, 1921. Serial No. 512,232.

*To all whom it may concern:*

Be it known that I, FRANK N. RUSSELL, a citizen of the United States, and a resident of Elmira, in the county of Chemung and State of New York, have invented certain new and useful Improvements in Trolley Wheels; and I do hereby declare the following to be a full, clear, and exact description of the invention, such as will enable others skilled in the art to which it appertains to make and use the same.

This invention relates to improvements in trolley wheels,—one object of the invention being to provide a simple and efficient construction whereby the tire or tread portion of the wheel shall consist of a member separable from the other portions of the wheel, so that it may be readily removed when worn and replaced by a new tire or tread member, and to so construct and assemble said member in the wheel that the threaded portions uniting the same with the other portions of the wheel will not be subjected to liability of destruction should the separable tire or tread member be permitted to be subjected to excessive wear before removing the same.

With this and other objects in view, the invention consists in certain novel features of construction and combinations of parts as hereinafter set forth and pointed out in the claims.

In the accompanying drawings, Figure 1 is a view of a trolley wheel showing an embodiment of my invention, and Figure 2 is a view in section on the line 2—2 of Figure 1.

My improved trolley wheel comprises two disk or body members 1—1 and an interposed tire or tread member 2,—the latter being so located between the members 1—1 that those portions of the latter projecting beyond the tire or tread member will constitute flanges such as usually employed in the construction of trolley wheels.

Each disk or body member 1 is provided with a circular groove or recess 3 having its opposite walls threaded and the tire or tread member 2 consists of a ring of comparatively soft metal (such as copper) and is so threaded both externally and internally that it may be screwed into the circular recesses of the respective disk or body members of the wheel. If desired, that portion of the periphery of the ring or tread member 2 which is between the threaded portions of said member, may be grooved slightly as indicated at 5 for the accommodation of the trolley wire.

In assembling the wheel, the ring or tread member 2 may first be screwed into the circular recess of one of the disks or body members 1 and then the other disk or body member may be screwed onto said ring or tread member.

It will be observed that the disks or body members are spaced apart by the ring or tread member 2 and the respective disks or body members are prevented from turning relatively to each other, by means of a bushing 6 passing through the hub portions 1ª of said disks or body members and provided with a key or spline 7 to enter suitable grooves in said hub portions. If desired, the space 8 between the two disks of the wheel and enclosed by the thread ring 2 may be utilized to facilitate the introduction of oil to lubricate the bushing or rather the bearing of the latter upon the spindle 9.

Having fully described my invention what I claim as new and desire to secure by Letters-Patent, is:

1. A trolley wheel comprising two disk or body members, each having a circular groove in its inner face, and a separable tire or tread member disposed between said disks or body members and entering the circular grooves in the same.

2. A trolley wheel comprising two disks or body members, each having a circular groove in its inner face, and an interposed tire or tread member threaded into the grooves of the respective disks or body members.

3. A trolley wheel comprising two disks or body members, each having a circular groove in its inner face, the opposing walls of said grooves being threaded, and an interposed tire or tread member consisting of a ring having exterior and interior threaded portions to screw into the circular recesses of the respective disk or body members.

4. In a trolley wheel, the combination with two disk or body members spaced apart and provided in their inner faces with recesses, of a circular tire or tread member having parts entering said recesses in the disk or body members and separable from the latter, and a bushing passing through the respective disks or body members and keyed thereto.

In testimony whereof, I have signed this specification in the presence of two subscribing witnesses.

FRANK N. RUSSELL.

Witnesses:
B. G. SMITH,
H. H. SATTERLEE.